(12) United States Patent
Lee et al.

(10) Patent No.: US 7,460,833 B2
(45) Date of Patent: Dec. 2, 2008

(54) TRANSMITTING APPARATUS OF COMMUNICATION SYSTEM

(75) Inventors: Hong-Sup Lee, Seoul (KR); Hyun-Kyu Chung, Daejon (KR); Kwang-Chun Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 511 days.

(21) Appl. No.: 11/255,700

(22) Filed: Oct. 21, 2005

(65) Prior Publication Data
US 2006/0089109 A1    Apr. 27, 2006

(30) Foreign Application Priority Data
Oct. 22, 2004   (KR) ................ 10-2004-0084755
Apr. 21, 2005   (KR) ................ 10-2005-0033114

(51) Int. Cl.
*H04Q 7/00*   (2006.01)
(52) U.S. Cl. .............. 455/63.1; 375/144; 375/260
(58) Field of Classification Search ............ None
See application file for complete search history.

(56) References Cited

U.S. PATENT DOCUMENTS 6,131,013 A * 10/2000 Bergstrom et al. ......... 455/63.1

6,331,996 B1   12/2001 Lin et al.

OTHER PUBLICATIONS

Bourdoux A et al, "Non-reciprocal transceivers in OFDM/SDMA systems: Impact and Mitigation," Radio and Wireless Conference, 2003. RAWCON '03. Proceedings Aug. 10-13, 2003, Piscataway, NJ, USA, IEEE, pp. 183-186.
Charles S et al, "Channel sounder for 5.5 GHz wireless channels," IEE Proceedings: Communications, Institution of Electrical Engineers, GB, vol. 150, No. 4, Jul. 15, 2003, pp. 253-258.
'Digital signal processing techniques applied to mobile radio channel sounding' Fannin et al., IEE Proceedings-F, vol. 138, No. 5, Oct. 1991, pp. 502-508.
'Deconvolution Noise in DS-Radio Channel Sounding and a Polynomial Compensation Method' Korhonen et al., Helsinki University of Technology, Communications Laboratory, Finland, IEEE 1997, pp. 806-810.

* cited by examiner

*Primary Examiner*—Thanh C Le
(74) *Attorney, Agent, or Firm*—Ladas & Parry LLP

(57) ABSTRACT

A transmitting apparatus according to the present invention includes a prefilter for compensating a previously measured estimated impulse response of a communication system by assuming a communication system in which the transmitting apparatus and the receiving apparatus are directly connected. The prefilter included in the transmitting apparatus compensates an original characteristic of a communication system. Accordingly, the prefilter enables an accurate channel measurement of a receiving apparatus without any increase of calculation.

5 Claims, 4 Drawing Sheets

TRANSMITTING APPARATUS OF COMMUNICATION SYSTEM

CROSS-REFERENCE TO RELATED APPLICATION

This application claims priority to and the benefit of Korean Patent Application 10-2004-0084755 and 10-2005-0033114 respectively filed in the Korean Intellectual Property Office on Oct. 22, 2004 and Apr. 21, 2005, the entire contents of which are incorporated herein by reference.

BACKGROUND OF THE INVENTION (a) Field of the Invention

The present invention relates to a communication system. More particularly, the present invention relates to a transmitting apparatus for enabling a receiving apparatus to measure a radio channel with increased accuracy in a communication system.

(b) Description of the Related Art

Generally, a communication system can operate properly when the system is designed to be suitable for a channel to be used. Therefore, it is important to understand characteristics of a channel used in the communication system in order to design the system.

The next generation wireless communication system needs a high data transmission speed because its aims include not only transmission of voice but also transmission of multimedia data. To accomplish a high speed data rate, various methods are currently being researched and developed (e.g., use of wideband frequency, multiple antennas, etc.).

A communication system using multiple antennas reacts to channel characteristics more sensitively than does a communication system using a single antenna. Accordingly, it is very important to understand the channel characteristics when designing the system using the multiple antennas.

A radio channel measuring system (radio channel sounder) measures a channel by using a pre-designated signal which is designated by a transmitting terminal and a receiving terminal. Such a channel measurement is performed by the receiving terminal. When a signal transmitted by the transmitting terminal through an antenna reaches the receiving terminal after passing through a radio channel, the receiving terminal correlates the pre-designated signal and obtains a channel measuring result. This channel measurement method has been used broadly since the 1980's.

When radio channel measurement first started, an analogue type of radio channel measurement system was primarily used. However, since the middle of the 1990's when digital technology was being developed, a digital radio channel measuring system has been dominantly used. But the digital radio channel measurement system actually uses an analogue type of signal in transmitting and receiving, so analogue elements such as an analogue filtering and amplifying unit are included in the communication system. Therefore, the communication system itself has its own impulse response, and the impulse response affects radio channel measurement values.

FIG. 1 shows a conventional communication system for radio channel measurement.

As shown in FIG. 1, the communication system for radio channel measurement includes a transmitter 10, a radio channel 20, and a receiver 30. The transmitter 10 includes a pseudo-noise (PN) code generator 12 for diffusing a transmission signal in a PN code, a binary phase shift keying (BPSK) modulator 14 for BPSK-modulating the diffused signal, a pulse shaper 16 for shaping the modulated signal, and an analogue filtering and amplifying unit 18 (high power amplifier, HPA) for filtering the pulse shaped signal and amplifying the same. The receiver 30 includes an analogue filtering and amplifying unit 32 (low noise amplifier, LNA) for filtering and amplifying the signal received through the radio channel 20, a receiving filter 34 for filtering the amplified signal, and a correlating detector 36 for correlating the filtered signal with the PN code and calculating an estimated channel value.

Here, an original characteristic of the communication system generally means some kinds of nonlinearities of filters and elements included in the transmitter 100 and receiver 300. The original characteristic of the communication system interferes with accurate channel measurement. In more detail, it causes a distortion of channel value and a reduction of system resolution. Therefore, the original characteristic of the communication system needs to be compensated or eliminated in order to increase accuracy of the radio channel measurement.

In 1991, P. C. Fannin et al. proposed a matched filter (MF) method for compensating such an original characteristic of the communication system. This method is for equalizing an original impulse response of the communication system by using the MF considering the original impulse response (refer to P. C. Fannin, A. Molina, S. S. Swords and P. J. Cullen, Digital signal processing techniques applied to mobile radio channel sounding, IEE Proceedings F, Radio and Signal Processing, vol. 138, pp. 502-508, October 1991).

In 1997, T. Korhonen et al. proposed a method in which a matched filter deconvolution (MFD) method having better performance is used with a polynomial compensation method. The MFD method can increase resolution by sacrificing signal-to-noise ratio (SNR), and the polynomial compensation method prevents a loss of SNR by decreasing deconvolution noise occurring in a MFD process. This method cannot compensate the original characteristic of the communication system, but compensates a channel measurement error caused by a characteristic of PN code (refer to T. Korhonen and S-G. Haggman, Deconvolution Noise in DS-Radio Channel Sounding and a Polynomial Compensation Method, IEEE PIMRC '97, vol. 3, pp. 806-810, September 1997).

The prior arts mentioned above have drawbacks in that they cannot provided accurate measurement of a channel because they reduce system performance by amplifying noise, and they cannot compensate the original characteristic of the communication system. In addition, an operation burden is increased because compensation of the receiver 300 needs to be performed on the received signal.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a transmitting apparatus having advantages of enabling a receiving apparatus to measure a radio channel with increased accuracy in a communication system.

In more detail, the advantage of the present invention is to provide a transmitting apparatus for enabling accurate radio channel measurement without an increase of operation burden of a receiving apparatus by compensating an original characteristic of a communication system.

An exemplary transmitting apparatus according to an embodiment of the present invention is for enabling a receiving apparatus to measure a radio channel accurately. The transmitting apparatus includes a code generator, a modulator, a pulse shaper, an analogue filtering and amplifying unit, and a prefilter.

The code generator diffuses a signal to be transmitted by a pseudo-noise (PN) code. The modulator modulates the diffused signal. The pulse shaper pulse-shapes the modulated signal. The analogue filtering and amplifying unit filters and amplifies the pulse-shaped signal. The prefilter compensates a previously measured estimated impulse response of the communication system by assuming a communication system in which the transmitting apparatus and the receiving apparatus are directly connected. Another exemplary transmitting apparatus according to another embodiment of the present invention is for enabling a receiving apparatus to measure a radio channel accurately. The transmitting apparatus includes a pseudo-noise (PN) code generator, a modulator, a pulse shaper, and an analogue filtering and amplifying unit. The pseudo-noise (PN) code generator prefilters and diffuses a signal to be transmitted by the PN code in which a compensated value of an impulse response of the communication system is stored after assuming a communication system in which the transmitting apparatus and the receiving apparatus are directly connected. The modulator modulates the prefiltered and diffused signal. The pulse shaper pulse-shapes the modulated signal. The analogue filtering and amplifying unit filters and amplifies the pulse-shaped signal and transmits the signal to the receiving apparatus.

DETAILED DESCRIPTION OF THE EMBODIMENTS

Figure 1:
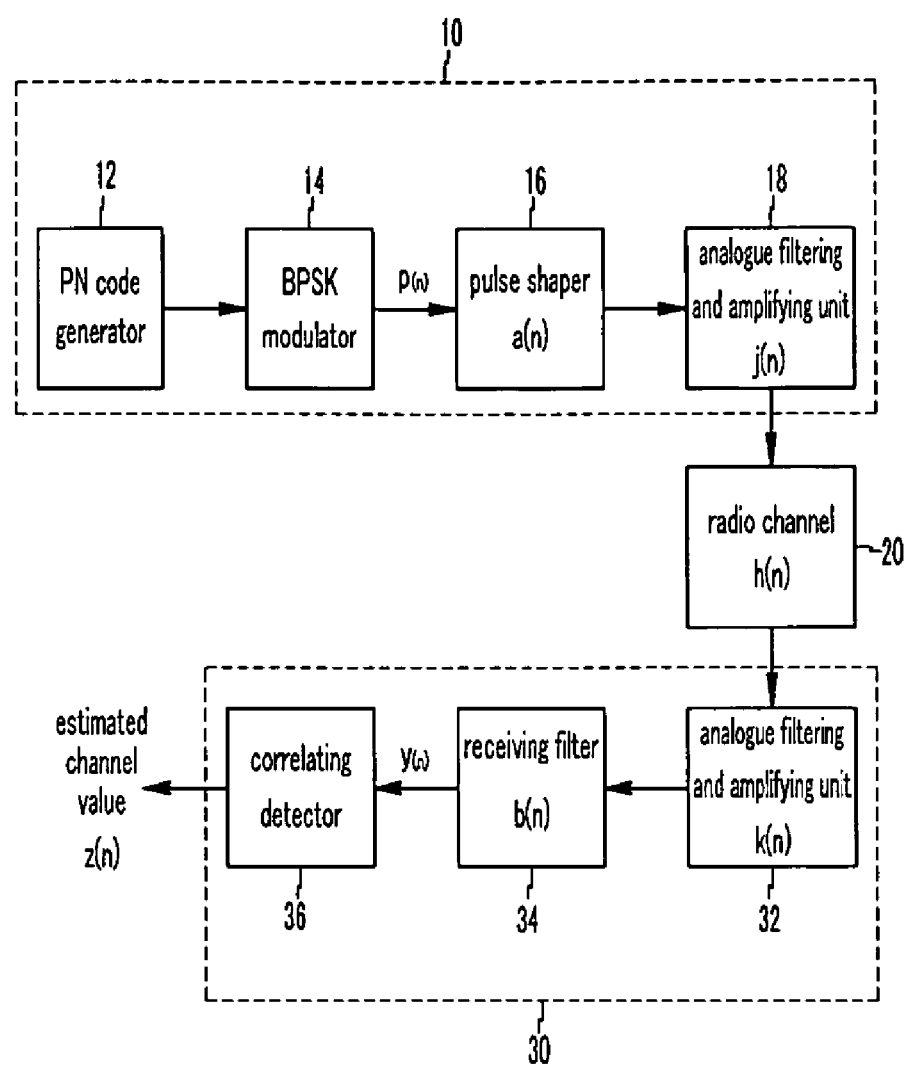
FIG. 1 shows a conventional communication system for measuring a radio channel.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a transmitting apparatus of a communication system according to an exemplary embodiment of the present invention will be described in detail.

Figure 2:
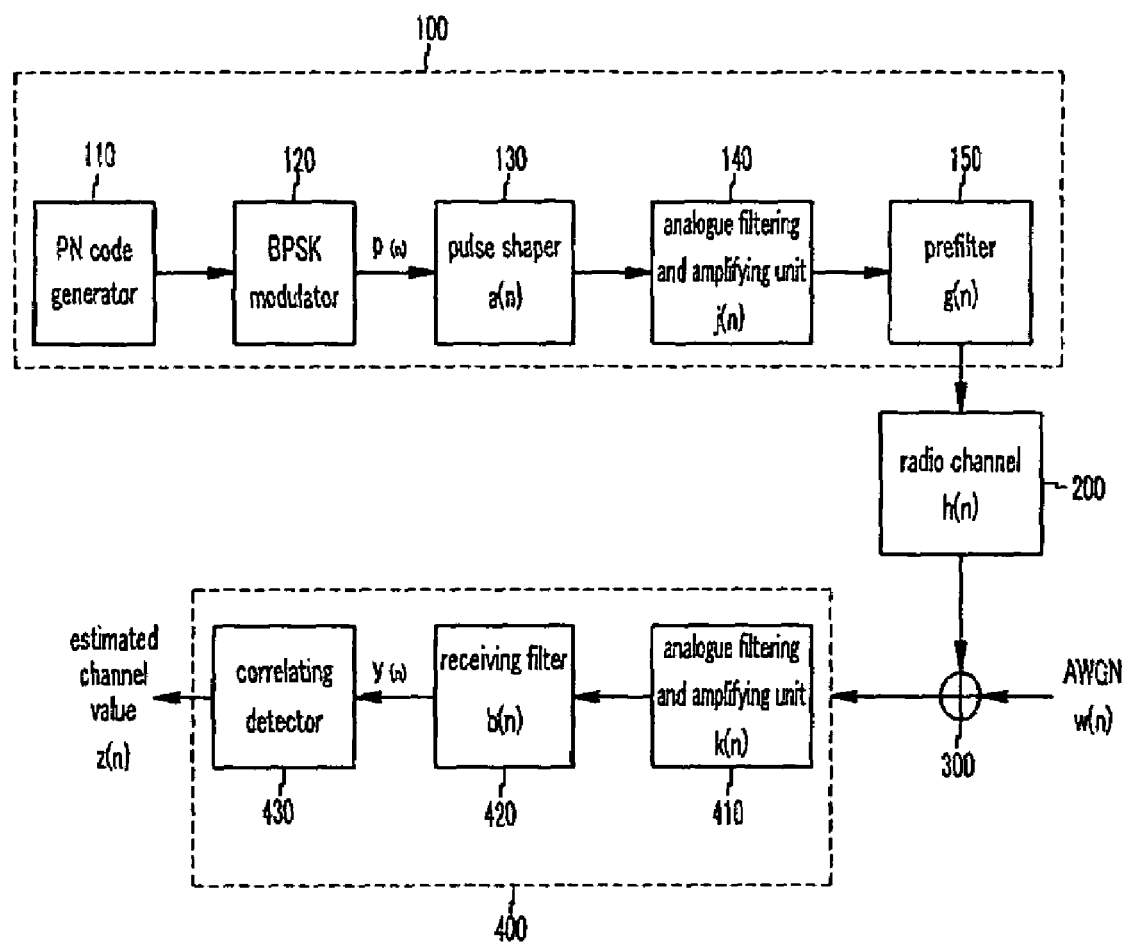
FIG. 2 shows a communication system according to a first exemplary embodiment of the present invention.

FIG. 2 shows a communication system according to the first exemplary embodiment of the present invention.

As shown in FIG. 2, the communication system includes a transmitter 100, a radio channel 200, an adder 300, and a receiver 400.

The transmitter 100 includes a pseudo noise (PN) code generator 110, a binary phase shift keying (BPSK) modulator 120, a pulse shaper 130, an analogue filtering and amplifying unit 140, and a prefilter 150.

The PN code generator 110 multiplies a PN code to a transmitting signal and diffuses it. Here, the PN code is used in order that the receiver 400 distinguishes each radio channel 200 through which signals transmitted by the transmitter 100 are transmitted.

The BPSK modulator 120 performs BPSK-modulation on the diffused signal. Though the BPSK modulation scheme is used in FIG. 2, a quadrature phase shift keying (QPSK) modulation scheme, a 16 quadrature amplitude modulation (QAM) scheme, or a 64 QAM scheme also can be used.

The pulse shaper 130 pulse-shapes the modulated signal.

The analogue filtering and amplifying unit 140 filters and amplifies the pulse-shaped signal.

The prefilter 150 prefilters the filtered and amplified signal, and transmits it to the receiver 400 through the radio channel 200. Thereby, the prefilter 150 compensates the original characteristic of the transmitter 100 and the receiver 400 of the communication system without amplification of noise, and enhances accuracy of the channel measurement. The prefilter 150 compensates an estimated impulse response of the communication system. Both of digital and analogue types are applicable for the prefilter 150. However, in consideration of design flexibility, the digital type will be more efficiently utilized.

In FIG. 2, the prefilter 150 is illustrated to be next to the analogue filtering and amplifying unit 140, but it can be arranged in any place of the transmitter 100. Here, the prefilter 150 of a digital type will be placed in a digital part of the transmitter 100.

The adder 300 adds an additive white Gaussian noise (AWGN) to the signal transmitted through the radio channel 200. The signal is transmitted to the receiver 400. Here, the AWGN means a permanently existing noise broadly scattered in frequency bandwidth, and white means that it includes all frequency bandwidths, analogous to the fact that when lights of every color are gathered it will be white light.

The receiver 400 includes an analogue filtering and amplifying unit 410, a receiving filter 420, and a correlating detector.

The analogue filtering and amplifying unit 410 filters the signal received through the radio channel 200, and amplifies it.

The receiving filter 420 filters the filtered and amplified signal.

The correlating detector 430 correlation-detects the filtered signal with the PN code, and obtains an estimated channel value.

Figure 3:
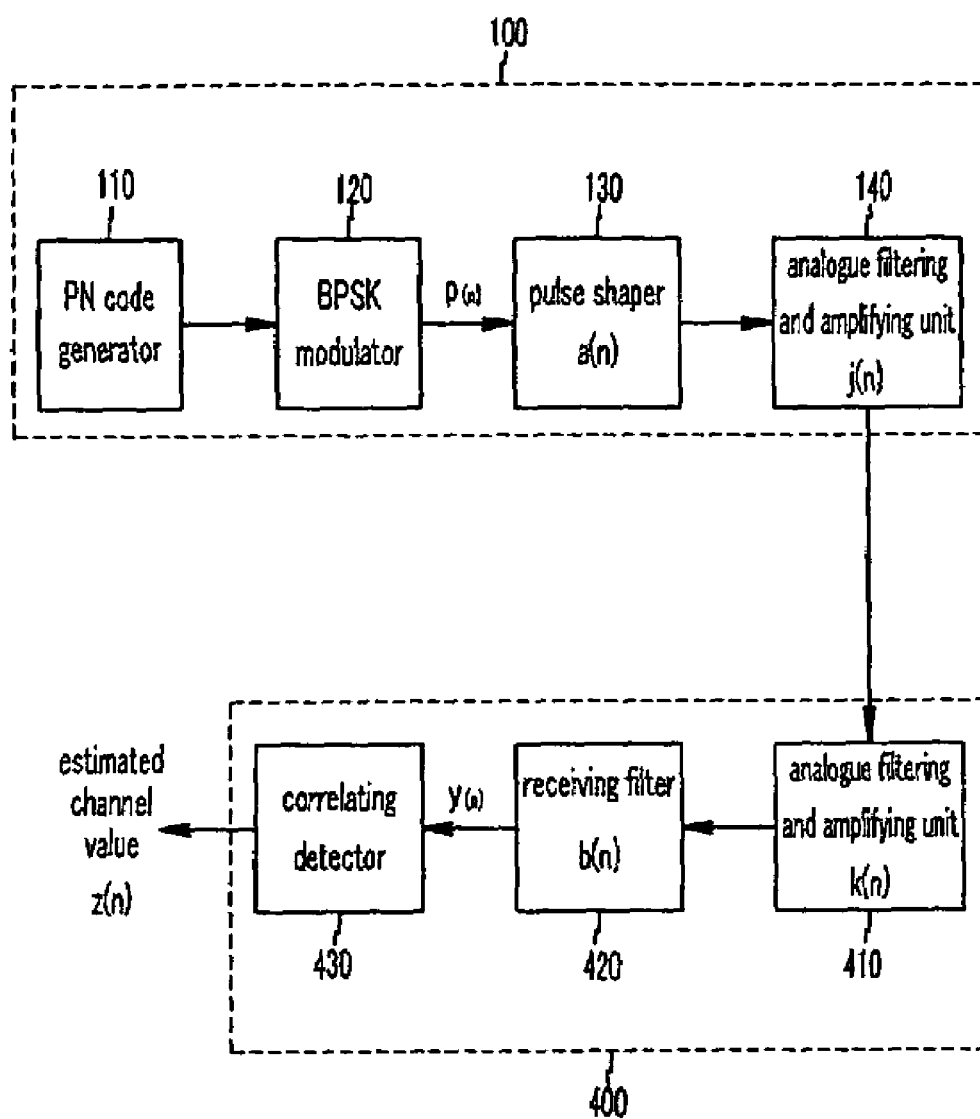
FIG. 3 shows a system for obtaining impulse responses of a transmitter and a receiver which is necessary in designing a prefilter shown in FIG. 2.

FIG. 3 shows a method for obtaining impulse responses of the transmitter and the receiver which is necessary in designing the prefilter shown in FIG. 2.

As shown in FIG. 3, in order to design the prefilter 150, the transmitter 100 and the receiver 400 are directly connected, and the impulse response of the communication system, which is estimated by transmitting and receiving the PN code, is used.

To design the prefilter 150, firstly a system impulse response characteristic of the communication system (i.e., system impulse response) which is to be compensated needs to be obtained. The impulse response m(n) of the communication system may be given as Equation 1.

$$m(n)=j(n)*k(n)$$ [Equation 1]

Here, n is a discrete sample index, j(n) and k(n) respectively indicate impulse responses of the analogue filtering and amplifying unit 140 and the analogue filtering and amplifying unit 410 shown in FIG. 2, and \* is a linear convolution operation.

According to an exemplary embodiment of the present invention, in order to estimate m(n), the transmitter 100 and the receiver 400 are directly connected as shown in FIG. 3. Here, compared with FIG. 2, the adder 300 is omitted in FIG. 3. This is because the prefilter 150 is not designed yet, and AWGN can be ignored when estimating m(n).

When the transmitter 100 and the receiver 400 are directly connected, an output y(n) of the receiving filter 420 and an output z(n) of the correlating detector 430 are given as Equation 2 and Equation 3.

$$y(n) = p(n) * a(n) * j(n) * k(n) * b(n) \quad \text{[Equation 2]}$$
$$= p(n) * \{a(n) * b(n)\} * \{j(n) * k(n)\}$$
$$= p(n) * \delta(n) * m(n)$$
$$= p(n) * m(n)$$

$$z(n) = \left\{\frac{N+1}{N}\delta(n) - \frac{1}{N}\right\} \otimes m(n) \quad \text{[Equation 3]}$$
$$= \frac{N+1}{N}\delta(n) \otimes m(n) - \frac{1}{N} \otimes m(n)$$
$$= \frac{N+1}{N}m(n) - \frac{1}{N} \otimes m(n)$$

In Equation 2, p(n) is the BPSK-modulated PN code, and a(n) and b(n) respectively indicate impulse responses of the pulse shaper 130 and the receiving filter 420.

The reason why a(n)\*b(n) becomes a Dirac delta function in discrete time is that a Nyquist filter such as a root raised cosine filter is used.

In Equation 3, N is a length of a PN code, and $\otimes$ indicates an L-point circular convolution operator. Here, L is given by adding 1 to the length of m(n).

When Equation 4 is fulfilled, $$\frac{1}{N} \otimes m(n)$$

can be ignored.

$$N = \sum_k |m(k)| \quad \text{[Equation 4]}$$

Here, k is an index corresponding to the length of m(n).

Since Equation 4 is mostly fulfilled when using a PN code having a large N, the estimated impulse response of the communication system $\hat{m}(n)$ can be given as Equation 5.

$$\hat{m}(n) = \frac{N}{N+1} z(n) \quad \text{[Equation 5]}$$

Thus, the impulse response of the transmitter 100 and receiver 400 is obtained, and then the prefilter 150 can be designed.

When designing the prefilter 150, a conventional zero-forcing (ZF) method is used. In more detail, when a frequency response of $\hat{m}(n)$ is assumed to be M(k), the impulse response of the prefilter 150 can be given as Equation 6. Here, the impulse response of the prefilter 150 corresponds to a compensated value of the estimated impulse response of the communication system.

$$M(k) = FFT[\hat{m}(n)]$$

$$g_c(n) = IFFT[1/M(k)]$$

$$g(n) = \text{unwrap}[g_c(n)] \quad \text{[Equation 6]}$$

In Equation 6, FFT indicates a fast Fourier transform (FFT), and IFFT indicates an inverse fast Fourier transform (IFFT). Function unwrap is changing a circular array to a linear array by cutting the circular array.

When measuring the radio channel while placing the thus-designed prefilter 150 in the transmitter 100, a channel can be measured accurately without distortion caused by the original characteristic of the communication system, and the amplification of noise caused by compensation does not occur so performance of the communication system may be increased.

Meanwhile, the process of designing the prefilter 150 is not performed while measuring the radio channel 200, but before measuring. Since the impulse response characteristic of the communication system is regarded to be time-invariant, the designing process of the prefilter 150 needs to be performed off-line once.

The prefilter 150 is used for compensating the characteristic of the radio channel measurement system. When a periodic signal which is used by most channel measurement systems is used, the quantity of calculation may not be increased. This is because a system shown in FIG. 4 can be provided.

Figure 4:
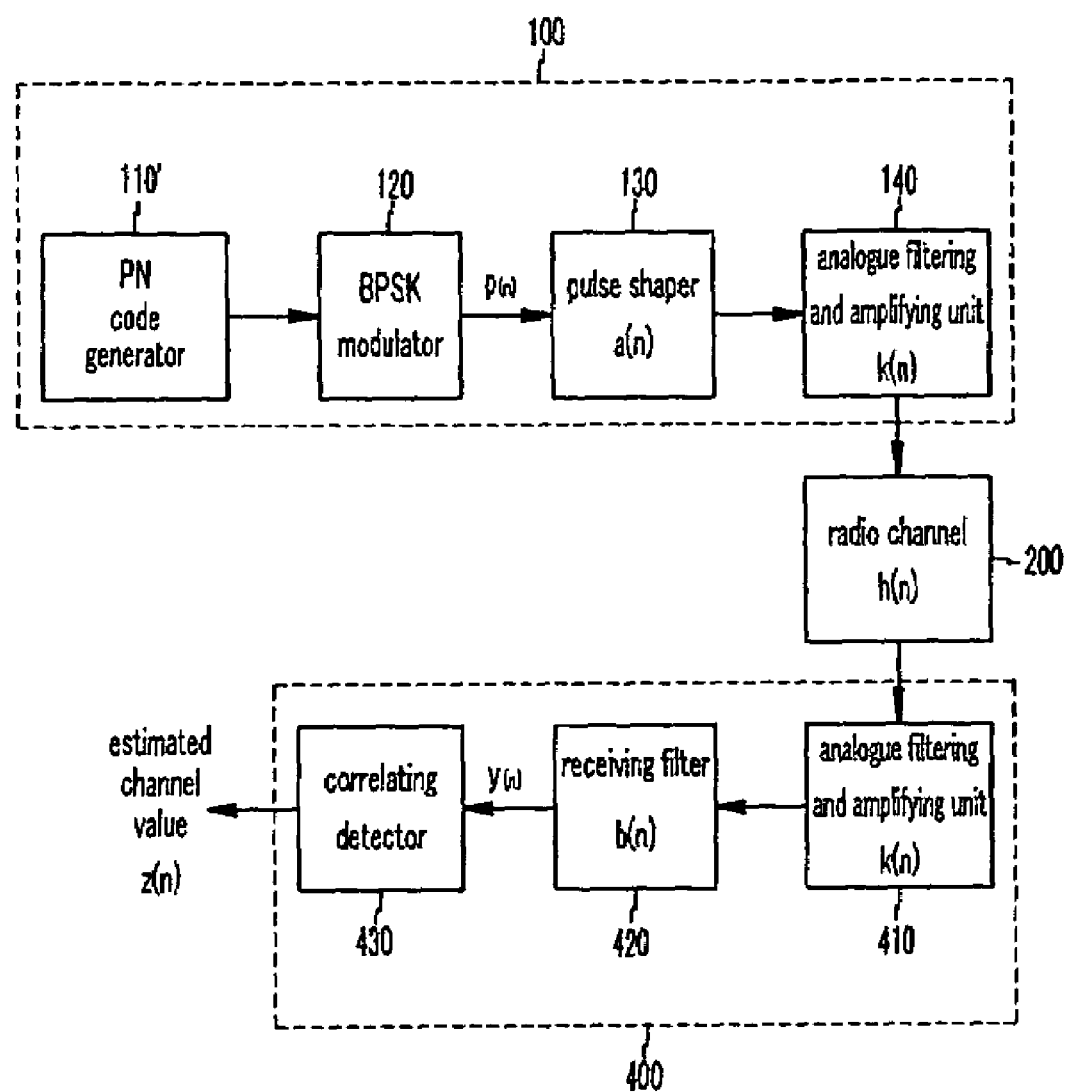
FIG. 4 shows a communication system according to a second exemplary embodiment of the present invention.

FIG. 4 shows a transmitting apparatus of the communication system according to a second exemplary embodiment of the present invention.

As shown in FIG. 4, the transmitting apparatus of the communication system according to the second exemplary embodiment of the present invention includes a PN code generator 110' using a PN code in which one period of output of the prefilter 150 is stored, but the transmitting apparatus does not include the prefilter 150 and the adder 300.

In other words, the PN code generator 110' shown in FIG. 4 is different from the PN code generator 110 shown in FIG. 3 in using the PN code in which one period of output of the prefilter 150 is stored. Hereinafter, a repeated description for the same constituent elements shown in FIG. 2 will be omitted, but the PN code generator 110' will be described in detail.

Firstly, it is assumed that the transmitter 100 and the receiver 400 are directly connected as shown in FIG. 3. The PN code generator 110 prefilters a signal to be transmitted with the PN code in which the compensated value of the previously measured estimated impulse response of the communication system (i.e., impulse response of the prefilter 150) is stored.

Generally, when a periodically repeated PN code signal passes the prefilter 150, the output of the prefilter 150 also becomes a periodically repeated signal. Therefore, the prefilter 150 is not necessary after storing the one period of output of the prefilter 150 in the PN code off-line. Here, the PN code to be stored is given as Equation 7.

one period of prefiltered PN code=one period of p(n)
\*g(n) [Equation 7]

Here, p(n) is the PN code, and g(n) is the impulse response of the prefilter. The impulse response of the prefilter corresponds to the compensated value of the estimated impulse response of the communication system.

Here, when the PN code in which the compensated value of the estimated impulse response of the communication system is repeatedly transmitted, the performance of the prefilter 150 can be obtained as it is without any increase of calculation. This can reduce the quantity of calculation significantly compared to the method of measuring the radio channel 200 by the receiver 400.

According to the present invention, the radio channel can be measured accurately without amplification of noise or an increase in calculations by compensating the characteristic of the transmitting apparatus and the receiving apparatus of the communication system. Moreover, an accurate measurement of the radio channel can be obtained without additional operation of the receiving apparatus, because the compensation process is performed by the transmitting apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting apparatus of a communication system for enabling a receiving apparatus to measure a radio channel, comprising:
    a code generator for diffusing a signal to be transmitted by a pseudo-noise (PN) code;
    a modulator for modulating the diffused signal;
    a pulse shaper for pulse-shaping the modulated signal;
    an analogue filtering and amplifying unit for filtering and amplifying the pulse-shaped signal; and
    a prefilter for prefiltering the filtered and amplified signal, and compensating a previously measured estimated impulse response of the communication system by assuming a communication system in which the transmitting apparatus and the receiving apparatus are directly connected.

2. The transmitting apparatus of claim 1, wherein the estimated impulse response of the communication system is estimated by the following equation $$\hat{m}(n) = \frac{N}{N+1} z(n), \text{ wherein:}$$

N is a length of PN code; and
z(n) is an output of the receiving apparatus.

3. The transmitting apparatus of claim 2, wherein an impulse response of the prefilter for compensating the estimated impulse response of the communication system is obtained by the following equation $$g(n) = \text{unwrap}[g_c(n)], \text{ wherein:}$$

$g_c(n)$ is obtained by IFFT[1/M(k)]; and
M(k) is obtained by FFT[$\hat{m}(n)$].

4. A transmitting apparatus of a communication system for enabling a receiving apparatus to measure a radio channel accurately, comprising:
    a pseudo-noise (PN) code generator for prefiltering and diffusing a signal to be transmitted by the PN code in which a compensated value of an impulse response of the communication system is stored after assuming a communication system in which the transmitting apparatus and the receiving apparatus are directly connected;
    a modulator for modulating the prefiltered and diffused signal;
    a pulse shaper for pulse-shaping the modulated signal; and
    an analogue filtering and amplifying unit for filtering and amplifying the pulse-shaped signal and transmitting the signal to the receiving apparatus.

5. The transmitting apparatus of claim 4, wherein the compensated valued of an impulse response estimate of the communication system is a prefiltered value of one period of the PN code.

* * * * *